June 30, 1925.

U. McDONALD

COMBINED FOOT REST AND CURTAIN HOLDER

Filed Feb. 19, 1924

1,544,018

Una McDonald
INVENTOR.

BY
ATTORNEYS.

Patented June 30, 1925.

1,544,018

UNITED STATES PATENT OFFICE.

UNA McDONALD, OF BELTON, TEXAS, ASSIGNOR OF ONE-HALF TO EDWIN PUDDY, OF BELTON, TEXAS.

COMBINED FOOT REST AND CURTAIN HOLDER.

Application filed February 19, 1924. Serial No. 693,797.

*To all whom it may concern:*

Be it known that I, UNA McDONALD, a citizen of the United States, residing at Belton, in the county of Bell and State of Texas, have invented certain new and useful Improvements in Combined Foot Rests and Curtain Holders, of which the following is a specification.

This invention relates to improvements in combined foot rests and curtain holders for automobiles, particularly adapted for utilizing the space in the rear of the front seat which is now substantially useless for this purpose.

An object of the invention resides in providing an article of the class described adapted for utilizing space in an automobile wherein the back of the front seat projects over the bottom of the tonneau of the automobile, which includes the provision of a pair of bracket members secured to the bottom portion of the tonneau and under the back of the front seat and connected at the lower end by a strip adapted to hingedly mount the door or closure member, and end members adapted for cooperation with the door and the bracket members for enclosing the space under the back of the front seat, so that the curtains of the machine may be placed in the compartment formed by the enclosure of said space, and when the door is closed, the same will serve as a foot rest for the occupants of the tonneau.

This invention includes other objects and improvements in the details of construction and arrangements of parts which are more particularly described in the following description and claim directed to a preferred form of the invention, it being understood however, that variations may be made in the specific construction of the parts and arrangements thereof without departing from the spirit and scope of the invention as claimed.

In the drawing, forming a part of this application:

Figure 1:
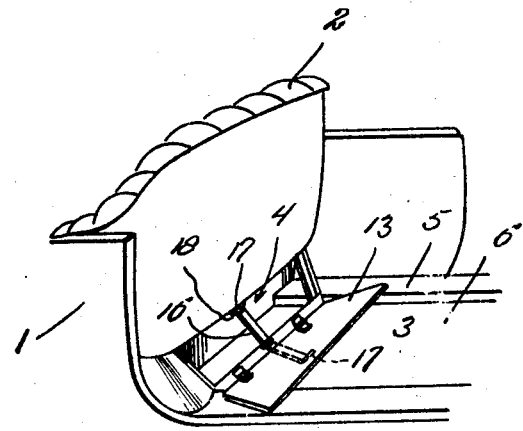
Figure 1 is a perspective view of a portion of an automobile showing the rear of the front seat and the manner of applying the invention thereto.

1 indicates a portion of the body of an automobile of a Ford type having a front seat 2, the back of which overhangs the tonneau portion 3 of the body, as generally indicated at 4. A pair of longitudinal side bars 5 extend throughout the length of the body and the usual construction thereof, the upper surfaces of which are positioned above the bottom 6 of the tonneau. Bar members 7 are provided with lateral extensions 8 at the upper end, and curved extensions 9 at the lower end, the extensions 9 being curved to extend in a direction opposite the extensions 8, and the extensions 8 and 9 of the pair of bar members 7 being directed in relative opposite directions. The bar members 7 are positioned under the overhanging portion of the back of the front seat 2, with the extensions 8 of the pair of bar members directed toward each other as clearly shown in Figure 2, the bar members extending downwardly at an incline to the inner edges of the longitudinal frame bars 5 and the extensions 9 seating on the upper faces of said bars 5 and being secured thereto by nails, screws or the like, through openings in the extensions. The lateral extensions 8 are also secured to the under side of the rear edge of the back of the front seat, by suitable nails or screws passed through the openings formed in the extensions. Plate members 10 are secured at one edge to the bar member 7 and extend outwardly therefrom along the upper face of the frame bars 5 and are curved at the outer edges to conform to the contour of the inner side of the body as indicated at 11, the upper end terminating under the rear edge of the back of the front seat, any suitable securing means being provided for securing the plates to the bars 7 which will hold them in place in compartment forming relation with the body of the automobile. The inner edges of the plates 10 are formed with offset extensions 12 extending forwardly with the body of the automobile to provide a seat for a hinged door 13 hingedly connected at 14 to a strip 15 secured to the floor 6 of the automobile between the longitudinal frame bars 5.

A strip member 16 is hinged to the central portion of the strip 15 and has a laterally projected free end as indicated at 17 to extend into and be retained by a keeper 18 for supporting the central portion of the door 13 in closed position, in which the outer face of the door lies flush with the outer face of the plate 10, while the offset extensions 12 of the plate support the inner side edges of the door in closed position.

Figure 2:
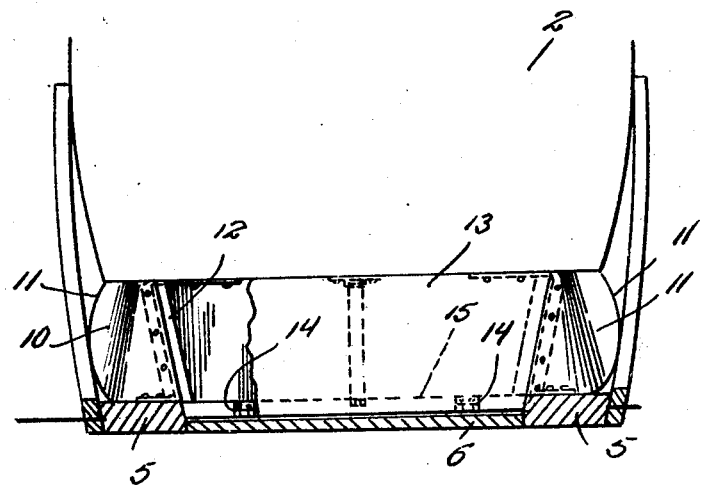
Figure 2 is a sectional view through the tonneau portion of an automobile body showing the back of the front seat in elevation with the invention applied thereto and the door closed.
Figure 3:
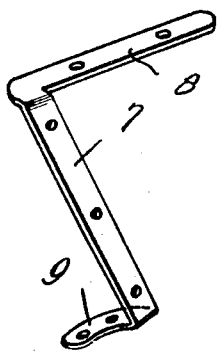
Figure 3 is a detail perspective view of one of the bracket members.

The strip 15 is positioned rearwardly in the body of the vertical plane of the back of the front seat, so that the door in closed position and the plate 10 have an upward and forward incline adapted to form a convenient foot rest for the occupants of the tonneau while the door is in closed position. The compartment formed by the plate in the door under the back of the front seat utilizes what is now substantially waste space for any desirable purpose and is particularly adapted for providing a suitable compartment for the side curtain when removed from the top, the same being rolled and inserted into the compartment by opening the door 13 and moving the strip member 16 out of engagement with its keeper so that the curtains may be inserted in the compartment, the parts being subsequently moved to closed position as shown in Figure 2, so that the curtains are not only protected from breakage but the door and plate in compartment forming relation cooperate with the body to form a convenient foot rest.

It will thus be seen that novel means have been provided for utilizing waste space in the tonneau of an automobile for providing a curtain receiving compartment as well as a foot rest.

What is claimed is:

Means for utilizing waste space in the tonneau of an automobile, wherein the automobile has spaced parallel side bars, a bottom positioned between and below the upper surface of said side bars, and the back of the front seat overhangs the bottom portion of the tonneau, comprising bar members having oppositely directed lateral extensions on the opposite ends thereof adapted to be secured to the bottom of the back of the front seat and the upper side of the frame bars at each side of the automobile body, plate members secured to said bar members and extending outwardly therefrom to conform to the contour of the interior of the automobile for forming a compartment at the ends thereof with the body, said plate having offset portions adjacent said bar member, a strip mounted on the bottom of the automobile body between the frame bars and in line with said bar member, a door hinged to said strip and adapted to seat on said offset extensions of the plate member in closed position for forming a compartment under the overhanging portion of the back of the front seat, and also adapted to form a foot rest for the occupants of the back seat, a strip member hingedly connected with the central portion of the strip, and a keeper for receiving the free ends of the strips mounted on the under side of the back of the front face to provide a supplemental support for the central portion of the door in closed position for forming a foot rest.

In testimony whereof I affix my signature.

UNA McDONALD.